March 9, 1943. T. J. MORGAN ET AL 2,313,662
ONE-WAY CLUTCH FOR CINEMATOGRAPHS
Original Filed April 15, 1940
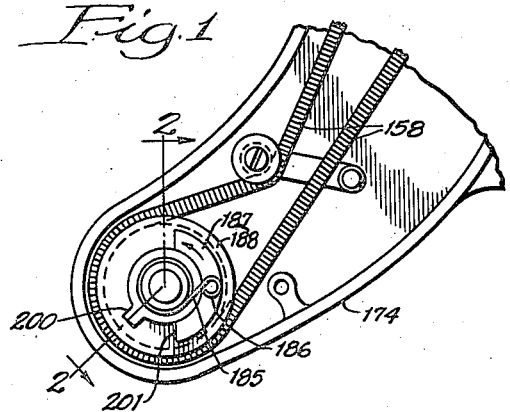
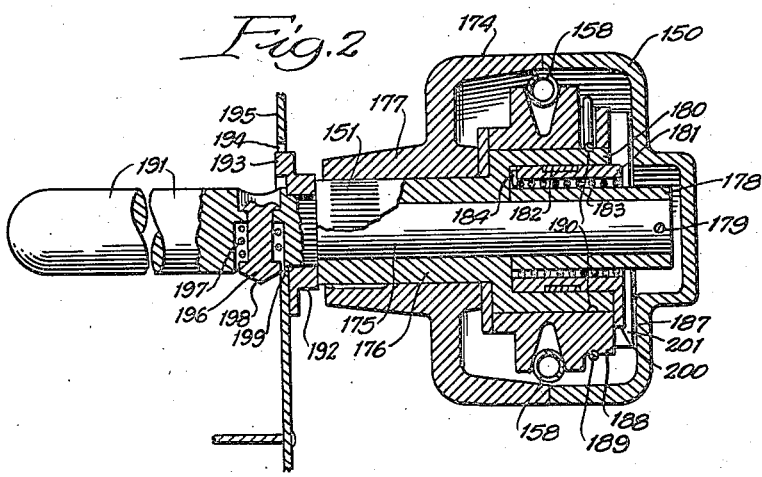
Inventors:
Thomas J. Morgan and
Arthur S. Dearborn,
By Soans, Pond & Anderson,
Attorneys.

Patented Mar. 9, 1943

2,313,662

UNITED STATES PATENT OFFICE 2,313,662

ONE-WAY CLUTCH FOR CINEMATOGRAPHS

Thomas J. Morgan, Chicago, and Arthur S. Dearborn, Hinsdale, Ill., assignors to Ampro Corporation, a corporation of Illinois Original application April 15, 1940, Serial No. 329,784. Divided and this application July 21, 1941, Serial No. 403,369

4 Claims. (Cl. 192—41)

This invention relates to cinematographs and this application is a division of co-pending application, Serial No. 329,784, filed April 15, 1940. This application is directed particularly to the construction of a take-up spindle forming part of the improved cinematograph.

The main objects of the invention are to provide a spindle construction whereby the take-up reel may be positively driven in a forward or film take-up direction while at the same time being capable of reverse rotation independently of the movement of its driving means to thereby facilitate film re-winding; to provide efficient means for retarding or braking the reverse rotation of the take-up spindle to thereby insure tight film re-winding; and to provide a compact and small but efficient and durable spindle construction of the character indicated.

Other objects and advantages of the invention will be understood by reference to the following specification and accompanying drawing wherein there is disclosed a selected embodiment of the invention.

In the drawing:

Figure 1 is a side elevation of the take-up spindle driving means as seen upon removal of a cover plate; and Figure 2 is a section on the line 2—2 of Figure 1.

The improved take-up spindle construction as herein shown comprises a spindle 191 which is an extension of a shaft 175 suitably journaled in the bearing boss 177 formed as an integral part of a housing arm 174. The housing arm 174 may be an integral part of the main housing of the cinematograph and it is of such hollow construction as to be capable in cooperation with a removable cover element 159 for enclosing and guiding a suitably driven belt 158.

The spindle shaft 175 is journaled in a bushing or sleeve 176 which is fixedly positioned in the boss 177 by being driven into place therein and locked against rotation by means of knurling or the like indicated at 151.

A bushing sleeve 178 is secured by means of a pin 179 on the inner end of the spindle shaft 175 and the sleeve 176 is provided with an enlarged portion 180 which surrounds a portion of said bushing sleeve 178. Said enlarged portion 180 also encloses a sleeve member 181 which, in turn, surrounds said portion of the bushing sleeve 178. The bushing 176 and its enlarged hollow portion 180 constitute, in effect, a portion of the frame member 174, said hollow portion 180 being in the nature of a hollow hub or annulus.

A friction member 182 is positioned in a suitable recess in the member 181 for effecting a frictional connection between the member 181 and the surrounding bushing part 180 for a purpose which will presently appear. Between the bushing 181 and the sleeve 178 there is provided a coil spring 183 which has one end extended laterally as indicated at 184 into a slot provided in the sleeve 181 and its other end extended laterally as indicated at 185 into a suitable slot or opening 186 in a segmental flange 187 formed on one face of a pulley 188. Said pulley 188 is rotatably mounted on the enlarged portion 180 of the bushing 176 and it is locked against axial displacement thereon by any suitable means such as typified by a spring clip 189, which engages a groove 190 formed in the said member 180.

When the pulley 188 is driven in the forward or film take-up direction as indicated by the arrow in Figure 1, it carries forwardly the leg 185 of the spring 183 and tends to wind said spring tightly on the shaft-carried sleeve 178. Such tendency to wind the spring into gripping condition on the sleeve 178 results, of course, from the frictional resistance to turning of the sleeve 181 produced by the friction element 182 and its drag against the interior of the enlarged portion 180 of the fixed bushing 176.

The spindle shaft 175 may be rotated freely in both directions within the pulley and clutch structure if turning movement is effected from the outer, reel receiving end 191 of the shaft.

The outer or free end 191 of the spindle shaft 175 is somewhat enlarged in diameter and is adapted to enter the central opening of the standard film reels which are adapted to be employed in connection with this cinematograph. For locking the reel to the shaft for rotation therewith, there is provided on the shaft a collar 192 suitably secured to the shaft for rotation therewith, and said collar is provided with a laterally offset key or lug 193 which is designed to enter one of the slots 194 provided in the side 195 of a film reel.

For maintaining the reel side 195 in engagement with the face of the collar 192 and in interlocked relation to the lug 193, there is provided in the reel spindle 191 a transversely extending pin 196 which is yieldingly urged to move in an outward direction by spring means such as indicated at 197. The spring pressed pin 196 has a conically shaped end portion 198 which is adapted to permit the reel side to be forced over the pin without the necessity of locating the reel side so that the point or apex of the spring pressed pin 196 registers with one of the reel side slots 194 nor is it necessary to first align one of the slots 194 with the lug 193, as has been necessary in prior structures. In other words, by providing the retaining pin 196 with a conical point instead of the conventional round or ball-like end, it is made possible to force the pin without first accurately positioning the reel on the spindle.

Inasmuch as the central opening 199 in the reel side is usually a free fit on the spindle, there is sufficient play permitted to enable the reel to assume a position past the retaining pin 198 without having one of its slots 194 registered with the lug 193.

Slight rotation of the spindle shaft relative to the reel will then bring the lug into interlocking relation to one of the slots 194, whereupon the reel will automatically assume its interlocked relation to the lug 193 incident to the tendency of the cone-shaped end of the retaining pin 198 to thrust the reel laterally toward the collar 192.

When the device is operated in reverse for reverse picture projection or film rewinding purposes, it will be seen that the clutch spring 183 will be unwound and caused to loosen its grip on the shaft sleeve 178 whereby there will be no driving force imparted to the reel on the lower spindle 191. To avoid excessive unwinding of the spring, the sleeve 181 to which the inner end of the spring is anchored is provided with a laterally extending ear 200 which is adapted to be engaged by the end 201 of said segmental collar 187 of the pulley. It will be seen that when the end 201 of the segmental collar of the pulley engages the ear 200 of the sleeve 181, both the sleeve and pulley will be rotated as a unit, thereby preventing any further relative rotation which would tend to continue unwinding of the clutch spring.

The described structure simplifies the operation of reverse picture projection or re-winding of film in that it eliminates any requirement for clutch manipulation or belt switching or the like. With the described construction it is merely necessary to reverse the direction of rotation of the main drive of the apparatus, it being understood, of course, that the other reel spindle would in that case be positively driven in a reverse direction through the agency of any suitable one-way clutch arrangement which would permit the reel to rotate freely in the film-feeding direction. Inasmuch as this general relationship is well known in the art it is not herein illustrated or described in detail.

Changes in the described structure may be made without departing from the spirit of the invention, scope of which should be determined by reference to the following claims.

We claim:

1. In a cinematograph, a frame part having a bearing opening and a hollow hub, a pulley rotatably mounted on said hub, a spindle shaft rotatably mounted in said bearing opening, a clutch spring encircling said shaft within said hub, and a sleeve surrounding said spring and within said hub, the opposite ends of said spring being respectively connected to said sleeve and to said pulley, friction braking means between said sleeve and hub for resisting rotation of said sleeve, and interengaging means carried by said sleeve and pulley arranged to permit limited relative rotation therebetween.

2. In a cinematograph, a frame part having a bearing opening and a hollow hub, a pulley rotatably mounted on said hub, a spindle shaft rotatably mounted in said bearing opening, a clutch spring encircling said shaft within said hub, and a sleeve surrounding said spring and within said hub, the opposite ends of said spring being respectively connected to said sleeve and to said pulley, and friction braking means between said sleeve and hub for resisting rotation of said sleeve.

3. In a cinematograph, a frame part having a bearing opening and a hollow hub, a pulley rotatably mounted on said hub, a spindle shaft rotatably mounted in said bearing opening, a clutch spring encircling said shaft within said hub, and a sleeve surrounding said spring and within said hub, the opposite ends of said spring being respectively connected to said sleeve and to said pulley, friction braking means between said sleeve and hub for resisting rotation of said sleeve, said hollow hub being provided with an annular groove on its outer surface, and means removably carried by said pulley and extending into said annular groove for locking the pulley against axial displacement from said shaft.

4. In a cinematograph, a frame part having a bearing opening and a hollow hub, a pulley rotatably mounted on said hub, a spindle shaft rotatably mounted in said bearing opening, a clutch spring encircling said shaft within said hub, and a sleeve surrounding said spring and within said hub, the opposite ends of said spring being respectively connected to said sleeve and to said pulley, and friction braking means between said sleeve and hub for resisting rotation of said sleeve, said braking means comprising a spring metal band extending circumferentially of said sleeve and hub and shaped so as to normally resiliently engage both said sleeve and said hub, one of said engaged members being circumferentially recessed to receive said band.

THOMAS J. MORGAN.
ARTHUR S. DEARBORN.